US009464808B2

(12) United States Patent
Paskevich et al.

(10) Patent No.: US 9,464,808 B2
(45) Date of Patent: Oct. 11, 2016

(54) NOZZLE TIP ASSEMBLY WITH SECONDARY RETENTION DEVICE

(75) Inventors: Stephen C. Paskevich, Clyde, NY (US); Bryan T. Runkle, Ontario, NY (US); Curtis F. Harding, New York, NY (US); Jeffrey R. Lehtinen, Mentor, OH (US); Jie Qian, Victor, NY (US); Fady Bishara, Cincinnati, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 1947 days.

(21) Appl. No.: 12/612,977

(22) Filed: Nov. 5, 2009

(65) Prior Publication Data

US 2010/0107653 A1 May 6, 2010

Related U.S. Application Data

(60) Provisional application No. 61/111,381, filed on Nov. 5, 2008.

(51) Int. Cl.

| | |
|---|---|
| ***F02C 1/00*** | (2006.01) |
| ***F02G 3/00*** | (2006.01) |
| ***F23R 3/28*** | (2006.01) |

(52) U.S. Cl.

CPC ............... *F23R 3/283* (2013.01); *F23R 3/286* (2013.01); *F05B 2230/80* (2013.01); *Y10T 29/49721* (2015.01)

(58) Field of Classification Search

CPC ............... F23R 3/283; F05B 2230/80; Y10T 29/49721

USPC .................. 220/784, 786, 787, 366.1, 367.1; 60/748

See application file for complete search history.

(56) References Cited

U.S. PATENT DOCUMENTS

| | | | | |
|---|---|---|---|---|
| 2,982,099 A * | 5/1961 | Carlisle | F23R 3/10 60/742 |
| 3,286,459 A * | 11/1966 | Ephraim, Jr. | F02C 7/055 415/121.2 |
| 3,443,760 A * | 5/1969 | Simmons | F23D 11/26 239/403 |
| 3,628,686 A * | 12/1971 | Burton et al. | 220/784 |
| 3,788,067 A | 1/1974 | Carlisle et al. | |
| 3,901,446 A * | 8/1975 | Petreikis et al. | 239/132.5 |
| 4,198,815 A | 4/1980 | Bobo et al. | |
| 4,798,330 A * | 1/1989 | Mancini | F23D 11/10 239/8 |
| 5,117,637 A * | 6/1992 | Howell et al. | 60/748 |
| 5,601,446 A * | 2/1997 | Wright | 439/357 |
| 5,904,302 A * | 5/1999 | Brown | B64F 1/28 239/586 |
| 6,363,726 B1 * | 4/2002 | Durbin | F23R 3/286 60/748 |
| 6,367,262 B1 * | 4/2002 | Mongia | F23R 3/286 60/748 |
| 6,381,964 B1 * | 5/2002 | Pritchard, Jr. | F23R 3/286 60/748 |
| 6,389,815 B1 * | 5/2002 | Hura | F23R 3/386 60/748 |
| 6,442,940 B1 * | 9/2002 | Young | F23R 3/283 60/748 |
| 6,546,732 B1 * | 4/2003 | Young | F23R 3/286 60/740 |
| 6,622,488 B2 * | 9/2003 | Mansour et al. | 60/740 |
| 6,718,770 B2 * | 4/2004 | Laing | F23R 3/28 60/740 |

(Continued)

*Primary Examiner* — Thai Ba Trieu

(74) *Attorney, Agent, or Firm* — Renner, Otto, Boisselle & Sklar, LLP

(57) ABSTRACT

A nozzle tip assembly and method characterized by the use of a retention device including at least one tab that cooperates with a ledge for coupling a nozzle shroud to a nozzle adaptor. The retention device can be used as a secondary retention feature to prevent nozzle separation and/or to enable the fuel injector to be repaired without having to replace the entire assembly. The latter advantage is of particular benefit when there is damage during assembly or when the nozzle tip assembly is being overhauled.

19 Claims, 7 Drawing Sheets

(56) References Cited

U.S. PATENT DOCUMENTS 6,865,889 B2* 3/2005 Mancini .................. F23R 3/286 60/748
6,935,481 B2* 8/2005 Schmidt .................... 192/106 F
7,249,462 B2 7/2007 Aumont et al.
7,415,826 B2* 8/2008 McMasters ............. F23R 3/286 60/748
7,464,553 B2* 12/2008 Hsieh ...................... F23R 3/286 60/740
7,506,510 B2* 3/2009 Thomson ................ F23R 3/283 60/740
7,565,803 B2* 7/2009 Li ........................... F23R 3/286 60/748
7,581,396 B2* 9/2009 Hsieh ...................... F23R 3/286 60/748
7,788,927 B2* 9/2010 McMasters ............. F23R 3/283 60/739
7,841,368 B2* 11/2010 McMasters ............. F23R 3/283 138/109
8,056,834 B2* 11/2011 Gardner .................... B05B 1/32 239/507
8,240,151 B2* 8/2012 Pelletier .................. F23R 3/283 60/740
8,806,871 B2* 8/2014 McMasters ............... F23R 3/14 60/740
2006/0032235 A1 2/2006 Aumont et al.
2006/0248898 A1* 11/2006 Buelow ................... F23R 3/286 60/748
2007/0017224 A1* 1/2007 Li ........................... F23R 3/286 60/748
2007/0028595 A1* 2/2007 Mongia ................... F23R 3/286 60/748
2007/0028617 A1* 2/2007 Hsieh ...................... F23R 3/286 60/748
2007/0028618 A1* 2/2007 Hsiao ...................... F23R 3/286 60/748
2007/0028620 A1* 2/2007 McMasters ............. F23R 3/286 60/748
2007/0028624 A1* 2/2007 Hsieh ...................... F23R 3/286 60/748
2007/0119177 A1* 5/2007 McMasters ............. F23R 3/283 60/737
2007/0163263 A1* 7/2007 Thomson ................ F23R 3/283 60/740
2008/0066720 A1* 3/2008 Piper et al. ................... 123/470
2009/0255102 A1* 10/2009 McMasters ............. F23R 3/283 29/402.18
2009/0255116 A1* 10/2009 McMasters ............. F23R 3/283 29/889.1
2009/0255119 A1* 10/2009 McMasters ............. F23R 3/283 29/889.2
2009/0255120 A1* 10/2009 McMasters ............... F23R 3/28 29/889.2
2009/0255256 A1* 10/2009 McMasters ............. F23R 3/286 60/734
2009/0255257 A1* 10/2009 McMasters ............. F23R 3/283 60/734
2009/0255260 A1* 10/2009 McMasters ............. F23R 3/283 60/748
2009/0255261 A1* 10/2009 McMasters ............. F23R 3/283 60/737
2009/0255264 A1* 10/2009 McMasters ............. F23R 3/283 60/748
2009/0255265 A1* 10/2009 McMasters ............. F23R 3/283 60/748
2009/0256003 A1* 10/2009 McMasters ............. F23R 3/283 60/740
2009/0256007 A1* 10/2009 McMasters ............. F23R 3/283 239/463
2010/0065142 A1* 3/2010 McMasters ............. F23R 3/283 138/115
2010/0251720 A1* 10/2010 Pelletier .................. F23R 3/283 60/740
2011/0259976 A1* 10/2011 Tyler ....................... F23R 3/283 239/125
2013/0199191 A1* 8/2013 Tyler ....................... F23R 3/283 60/746
2014/0318137 A1* 10/2014 McMasters ............... F23R 3/28 60/742

* cited by examiner

NOZZLE TIP ASSEMBLY WITH SECONDARY RETENTION DEVICE

RELATED APPLICATIONS

This application claims the benefit of U.S. Provisional Application No. 61/111,381 filed Nov. 5, 2008, which is hereby incorporated herein by reference.

FIELD OF INVENTION

The present invention relates generally to injectors and nozzles, and more particularly to a retention device for a fuel injector and nozzle for gas turbine engines.

BACKGROUND

A gas turbine engine typically includes one or more fuel injectors for directing fuel from a manifold to a combustion chamber of a combustor. Each fuel injector typically has an inlet fitting connected either directly or via tubing to the manifold, a tubular extension or stem connected at one end to the fitting, and one or more spray nozzles connected to the other end of the stem for directing the fuel into the combustion chamber. A fuel passage (e.g., a tube or cylindrical passage) extends through the stem to supply the fuel from the inlet fitting to the nozzle. Appropriate valves and/or flow dividers can be provided to direct and control the flow of fuel through the nozzle and/or fuel passage.

SUMMARY OF INVENTION

The present invention provides a nozzle tip assembly and method characterized by the use of a retention device including at least one tab that cooperates with a ledge for coupling a nozzle shroud to a nozzle adaptor. The retention device can be used as a secondary retention feature to prevent nozzle separation and/or to enable the fuel injector to be repaired without having to replace the entire assembly. The latter advantage is of particular benefit when there is damage during assembly or when the nozzle tip assembly is being overhauled.

More particularly, a nozzle tip assembly for an injector includes a shroud configured to support an injection device interiorly of the shroud, and at least one tab having a catch or being deformable to form the catch that is configured to engage an axially rearwardly facing ledge for attaching the shroud to an adaptor.

The shroud may be unitary or comprised of several assembled together parts. The tab may be in the form of one or more fingers projecting rearwardly from a body of the shroud and having at their rearward ends respective radially outwardly or inwardly projecting catches.

The tab, and in particular the one or more fingers, may be resiliently flexible for insertion and/or removal of the shroud with respect to the adaptor. Alternatively or additionally, the tab, and in particular the one or more fingers, may be deformable radially outwardly or inwardly, for example by swaging, to form the catch or catches after the shroud has been assembled into the adaptor. Alternatively or additionally, the tab, and in particular the one or more fingers, allows air flow to pass through the injector without being interrupted by the one or more fingers.

The nozzle tip assembly may further include the adaptor that has one or more ledges for cooperating with the one or more catches of the tab or tabs. The ledges may be formed at an axially forward end of an axially extending groove or grooves. The axially reawardly facing end surface of the groove provides a latch surface for engagement by the respective catch.

The nozzle tip assembly may further include an injection device of any suitable design supported internally of the shroud.

Moreover, the present invention provides an injector including a housing in which the adaptor and nozzle tip assembly are assembled. According to a further aspect of the invention, a method for overhauling an injector including a housing in which an adaptor and nozzle tip assembly are assembled includes the steps of separating the shroud from the housing by flexing or deforming the tab or tabs to release the shroud from the adaptor and then removing the shroud from the housing. The method may further include the steps of inserting a new shroud or the overhauled shroud in the downstream end of the housing, securing the new shroud or the overhauled shroud to the adaptor via at least one tab, and welding the shroud or new shroud to the housing. The step of securing the new shroud or the overhauled shroud to the adaptor via at least one tab may further include deforming the at least one tab radially outwardly or inwardly to form the catch or catches to secure the shroud to the adaptor, for example by swaging. The method may also include assembling a new shroud or overhauling a previously assembled shroud.

The foregoing and other features of the invention are hereinafter described in greater detail with reference to the accompanying drawings.

DETAILED DESCRIPTION

The principles of the present invention have particular application to fuel injectors and nozzles for gas turbine engines and thus will be described below chiefly in this context. It will of course be appreciated, and also understood, that the principles of the invention may be useful in other applications including, in particular, other fuel nozzle applications and more generally applications where a fluid is injected by or sprayed from a nozzle.

Figure 1:
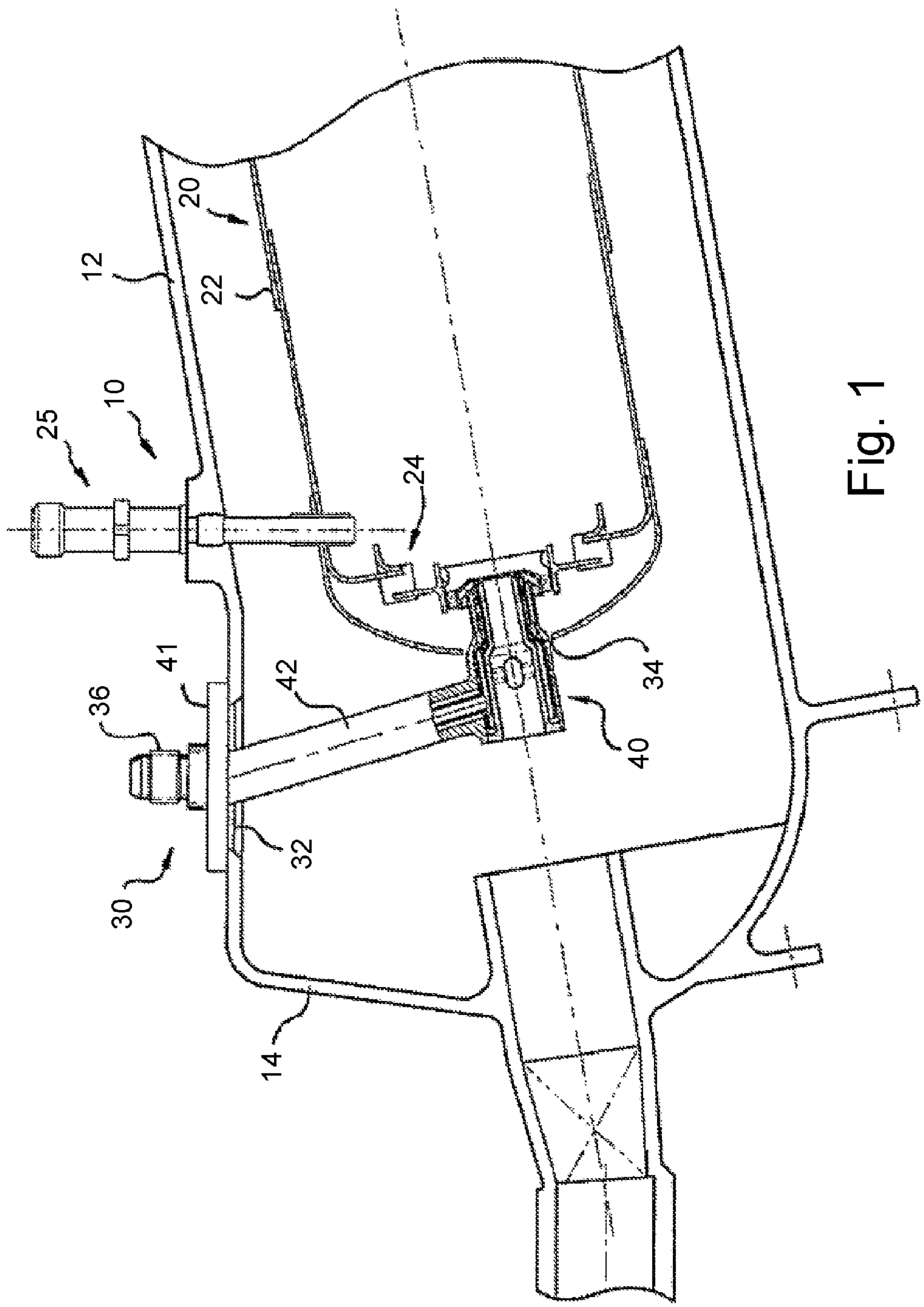
Fig. 1 PRIOR ART
FIG. 1 is a cross-sectional view of a portion of an exemplary gas turbine engine illustrating a fuel injector in communication with a combustor.

Referring now in detail to the drawings and initially to FIG. 1, a gas turbine engine for an aircraft is illustrated generally at 10. The gas turbine engine 10 includes an outer casing 12 extending forwardly of an air diffuser 14. The casing 12 and diffuser 14 enclose a combustor, indicated generally at 20, for containment of burning fuel. The combustor 20 includes a liner 22 and a combustor dome, indicated generally at 24. An igniter, indicated generally at 25, is mounted to the casing 12 and extends inwardly into the combustor 20 for igniting fuel. The above components can be conventional in the art and their manufacture and fabrication are well known.

A fuel injector, indicated generally at 30, is received within an aperture 32 formed in the engine casing 12 and extends inwardly through an aperture 34 in the combustor liner 22. The fuel injector 30 includes a fitting 36 exterior of the engine casing 12 for receiving fuel, as by connection to a fuel manifold or line; a fuel nozzle tip assembly, indicated generally at 40, disposed within the combustor 20 for dispensing fuel; and a housing 42 interconnecting and structurally supporting the nozzle tip assembly 40 with respect to fitting 36. The fuel injector 30 is suitably secured to the engine casing 12, as by means of an annular flange 41 that may be formed in one piece with the housing 42 proximate the fitting 36. The flange 41 extends radially outward from the housing 42 and includes appropriate means, such as apertures, to allow the flange 41 to be easily and securely connected to, and disconnected from, the casing 12 of the engine using, for example, bolts or rivets.

Figure 2:
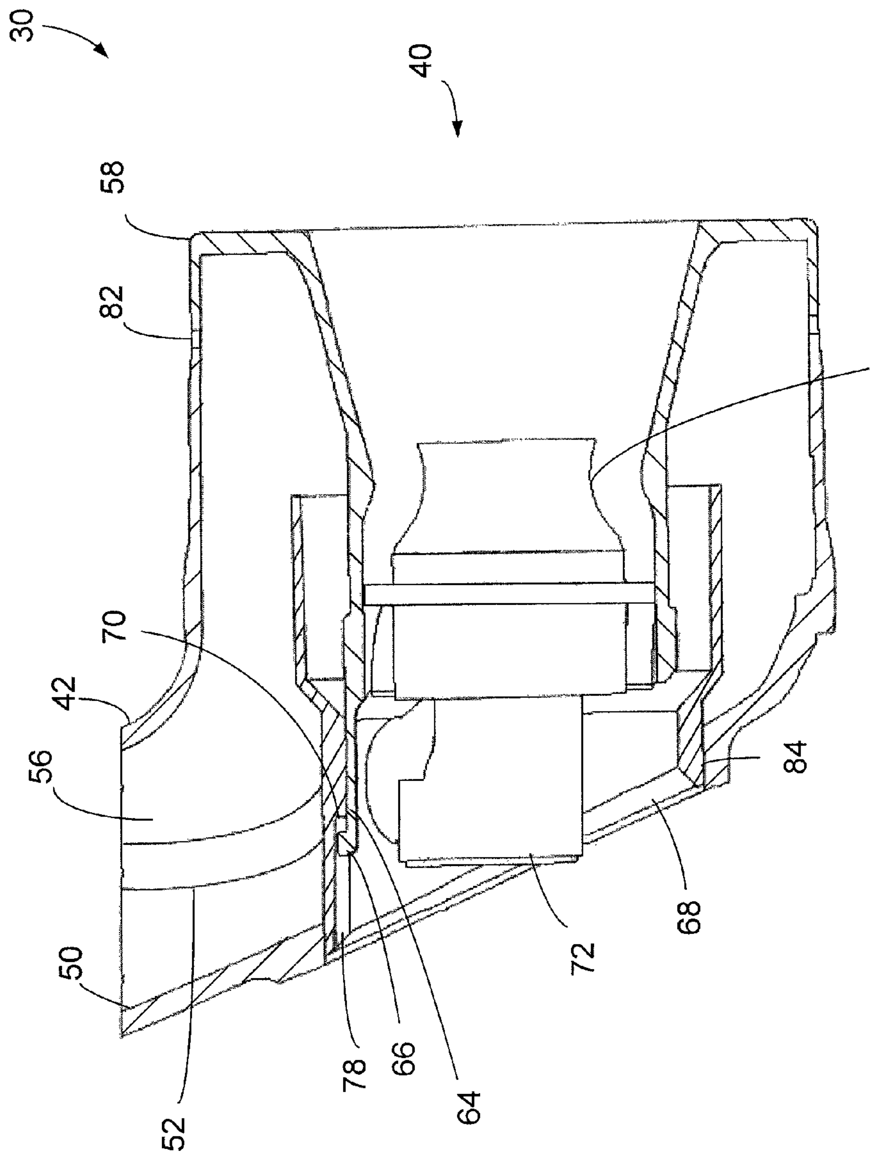
FIG. 2 is a fragmentary cross-sectional view of a fuel injector showing details of an exemplary nozzle tip assembly in accordance with the invention.

The fuel injector 30 shown in FIG. 1 is of the type disclosed in U.S. patent application Ser. No. 11/625,539 and is exemplary of a fuel injector to which principles of the invention may be applied. The nozzle tip assembly may be replaced by a nozzle tip assembly according to the present invention, and an exemplary nozzle tip assembly is shown in FIG. 2. For ease of description, the same reference numerals will be used to denote corresponding components.

As best seen in FIG. 2 when viewed in conjunction with FIG. 1, the housing 42 includes a central, longitudinally-extending bore 50 extending the length of the housing 42. A fuel conduit 52 extends through the bore 50 and fluidly interconnects fitting 36 and nozzle tip assembly 40. The fuel conduit 52 has an internal passage for the passage of fuel. The fuel conduit 52 is surrounded by the bore 50 of the housing 42, and an annular insulating gap 56 is provided between the external surface of the fuel conduit 52 and the walls of the bore 50. The insulating gap 56 provides thermal protection for the fuel in the fuel conduit 52. The housing 42 has a thickness sufficient to support nozzle tip assembly 40 in the combustor 20 when the injector 30 is mounted to the engine, and is formed of material appropriate for the particular application.

Referring now to the nozzle tip assembly 40 in detail, the nozzle tip assembly 40 is configured for insertion into the fuel injector 30, and in the illustrated embodiment, at a downstream end of the housing 42. The nozzle tip assembly 40 includes a nozzle adaptor 68 that is coupled to the housing 42 at an upstream end of the housing 42 by any suitable means, such as by brazing or welding at 84, or alternatively, the adaptor 68 may be integrally formed with the housing 42. The nozzle tip assembly 40 may also include a fluid injection device 72 that is configured to receive fluid, such as fuel, from the fuel conduit 52. The fluid injection device 72 may also be configured to disperse the fuel to an air swirler 80 to be mixed with air flowing through the fuel injector 30, and the fuel flow from the fluid injection device 72 can be metered based on the engine fuel manifold pressure. The fluid injection device and associated swirler may be of any suitable design for the intended application.

The nozzle tip assembly 40 also includes a nozzle shroud 58 that may be inserted into the fuel injector 30 from the downstream end of the housing 42, and may be coupled to the housing 42 at the downstream end by any suitable means, such as by welding at 82. Upon insertion into the fuel injector 30, the shroud 58 will at least be partially surrounded by the adaptor 68, and the fluid injection device 72 will be supported interiorly of the shroud 58. A rearward portion of the fluid injection device 72 may be coextensive with a rearward portion of the shroud 58 and the shroud 58 may radially outwardly surround the injection device 72.

In accordance with the invention, a retention device is used to provide a secondary retention feature for holding the shroud 58 to the adaptor 68 if the primary retention means, e.g. weld at 82, was to fail during use of the nozzle tip assembly. As will become more apparent below, the retention device additionally or alternatively enables the fuel injector to be repaired without having to replace the entire assembly. The latter advantage is of particular benefit when there is damage during assembly or when the nozzle tip assembly is being overhauled.

The retention device includes at least one tab on either the shroud or adaptor that cooperates with a ledge on the other for coupling the nozzle shroud to the nozzle adaptor. In the illustrated embodiment, the tab is provided on the shroud and the ledge is formed on the nozzle adaptor. Although the tab may be annularly continuous in some embodiments, more preferably the tab 64 is in the form of one or more fingers that are circumferentially spaced apart and extend axially rearwardly from a body portion of the shroud 58. At their rearward ends, each finger is provided with a radially outwardly projecting catch 66 for engaging the ledge (or ledges) on the adaptor.

The ledge or ledges may be formed in any suitable manner on the adaptor 68. The ledge, for example, may be formed by an axial end face of the adaptor, although in the illustrated embodiment the ledge is in the form of plural ledges 70 for respective fingers 64. The ledges are formed by the axially rearwardly facing end face of respective axial recesses 78 formed in the inner diameter surface of the adaptor 68, which recesses preferably are in the form of grooves. The recesses/grooves are circumferentially spaced apart in correspondence to the circumferential spacing of the tabs/fingers 64. If the primary retention device, e.g. weld 82, holding the shroud to the housing were to fail, any axial separation movement of the shroud relative to the adaptor would cause the catches to engage the ledges and create an axial interference to prevent separation of the shroud from the adaptor and thereby prevent damage to the gas turbine engine. Although when assembled the catches can be butted against the ledges, in the illustrated embodiment a space is provided to accommodate differential expansion of the adaptor and shroud while still providing a secondary retention feature.

When designing the tabs 64, certain design considerations can be taken into account such as installation stresses, excitation frequency, holding strength of the tabs, etc., and the design considerations may be affected by length, thickness, catch height, number of tabs, material properties, etc.

Figure 3:
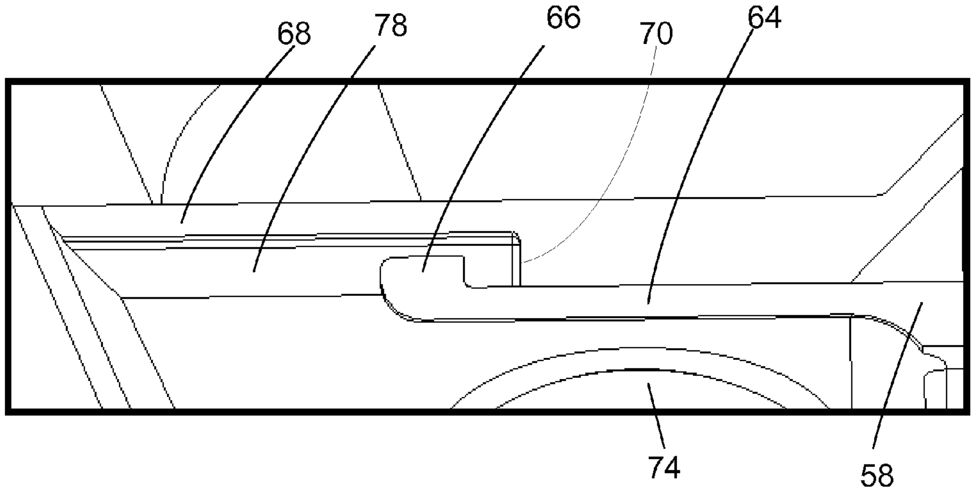
FIG. 3 is a cross-sectional view illustrating a tab being coupled to an adaptor in accordance with the invention.

With reference to FIG. 3, the catches may be pre-formed on the ends of the tabs/fingers, and the fingers preferably have sufficient resiliency to allow the catch to pass through the smaller diameter opening in the forward portion of the adaptor and then snap into the grooves 78 to engage behind the ledges.

Figure 4:
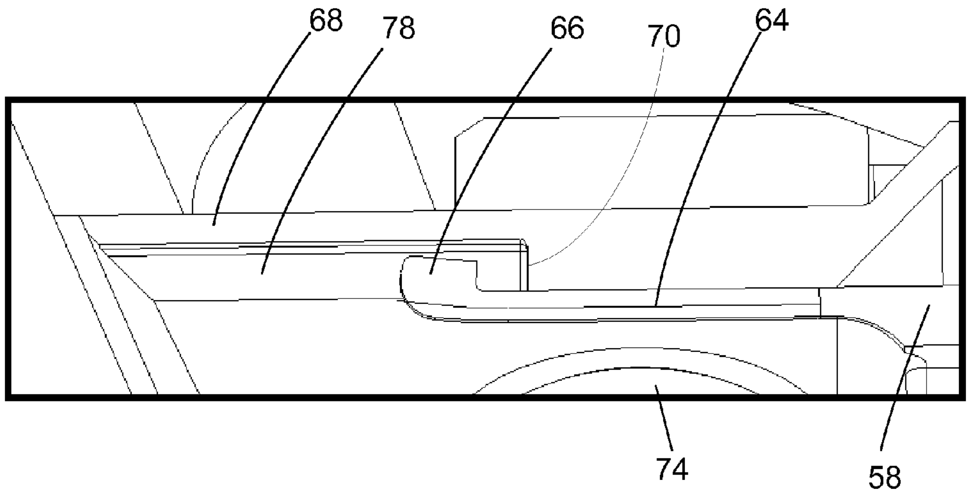
FIG. 4 is a cross-sectional view illustrating another tab being coupled to an adaptor in accordance with the invention.

FIG. 4 illustrates an alternative manner of assembly. Initially the radially outer extent of the fingers is such that they can pass through the opening in the forward portion of the adaptor without any significant flexing, and then the rear end portions are turned radially outwardly, as by swaging, to form the catches as seen in FIG. 4.

The foregoing arrangement also provides for removable coupling of the shroud to the adaptor. In this regard, the primary retention feature, e.g. weld 82, can be released, as by heating or cutting, and then the tabs/fingers deflected radially inwardly sufficiently to allow the catches to clear the ledges for passage through the opening at the forward end of the adaptor. This is discussed further hereinafter.

Referring in detail to the shroud 58 of FIG. 2, the shroud 58 may be unitary or may be composed of one or more parts, such as an inner shell and an outer shell, with the inner shell being supported centrally in the outer shell. The tabs 64 may extend rearwardly from a main tubular body portion of the inner shell, although it will be appreciated that the tabs 64 may extend from the outer shell, or from both the inner and outer shell. That is, the tabs/fingers may be unitary with one and/or both of the inner and outer shell.

To form the shroud, the inner shell is configured to be coupled to the outer shell by any suitable means, such as by brazing. The outer shell and inner shell may be inserted into the fuel injector 30 from the downstream end of the housing 42, with the shroud being supported centrally in the housing 42. The outer shell then may be coupled to the downstream end of the housing 42, such as by welding at 82, at its downstream portion. Once inserted into the fuel injector 30, the outer shell and inner shell may be at least partially surrounded by the adaptor 68 and coupled to the adaptor 68 via tabs 64, as described above.

Referring now to FIGS. 5-8, perspective views are shown of exemplary shrouds 58 and 158 and exemplary adaptors 68 and 168. The shrouds 58 and 158 include a plurality of circumferentially spaced apart finger like tabs 64 and 164. The plurality of tabs 64 and 164 may be received in a plurality of grooves 78 and 178 at the upstream end of the adaptors 68 and 168, with each groove 78, 178 having an end face (ledge) 70, 170 that can be engaged by radially outwardly projecting catches 66 and 166. The adaptors 68 and 168 may include an aperture 74, 174 that may provide access to the area inside the adaptor. The aperture may, for example, allow access for fuel to pass from outside the adaptor to a fluid injection device.

Figure 5:
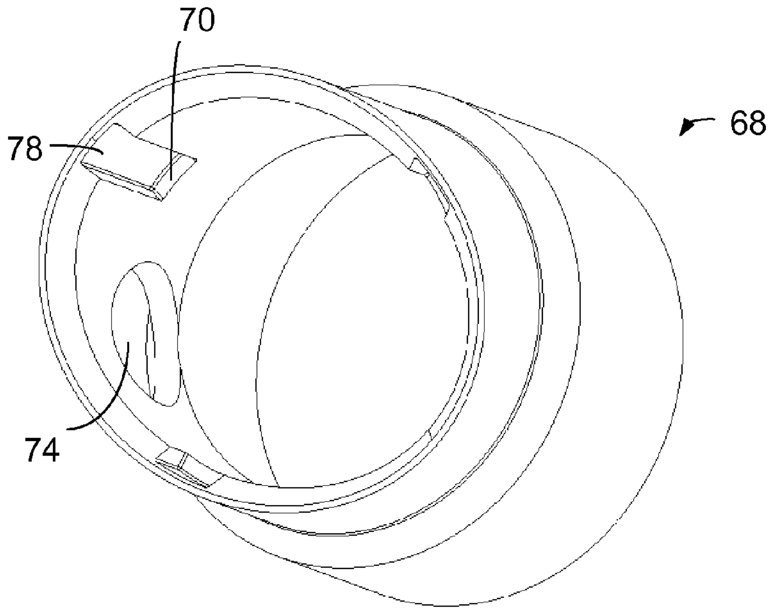
FIG. 5 is a perspective view of an exemplary adaptor in accordance with the invention.
Figure 6:
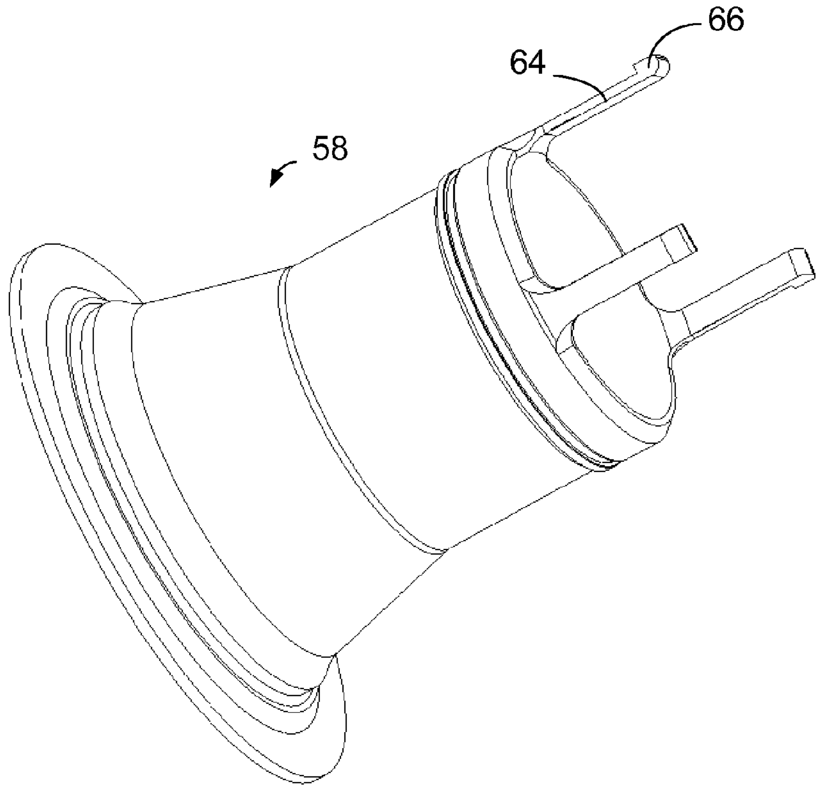
FIG. 6 is a perspective view of an exemplary shroud in accordance with the invention.
Figure 7:
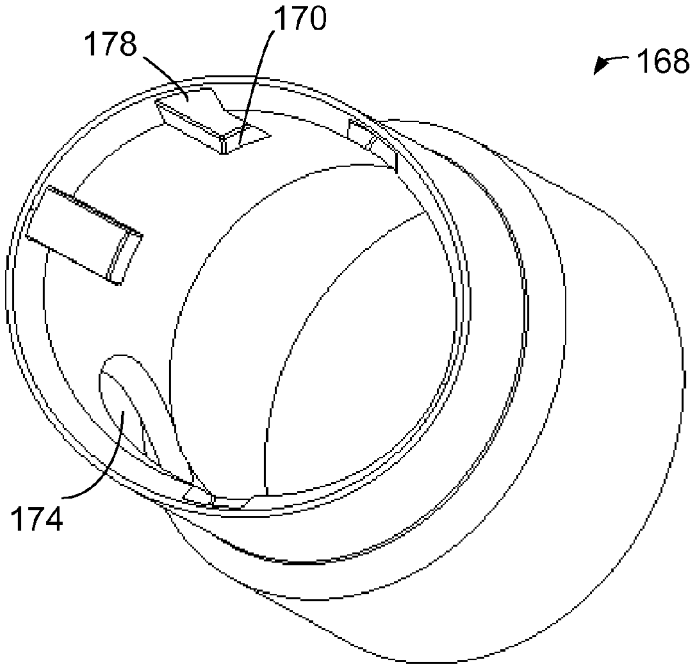
FIG. 7 is a perspective view of another exemplary adaptor in accordance with the invention.
Figure 8:
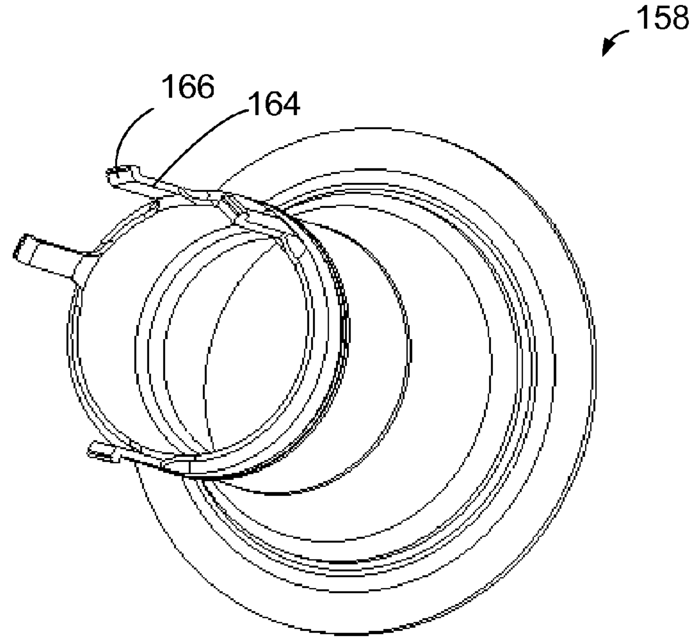
FIG. 8 is a perspective view of another exemplary shroud in accordance with the invention.

As shown in FIG. 5, the adaptor 68 has three grooves 78 for receiving three circumferentially spaced apart tabs 64 and as shown in FIG. 7, the adaptor 168 has four grooves 178 for receiving four circumferentially spaced apart tabs 164. The tabs 64 and 164 are configured to be resiliently flexible for insertion to and removal from the fuel injector 30. If the tabs 64 and 164 deform during installation, they can be post-installation formed to couple with the end faces 70 and 170 of the grooves 78 and 178.

The tabs 64 and 164 and the spacing between the tabs may be designed to allow air flow to pass through the fuel injector 30 without being interrupted by the tabs. It should be appreciated that although shrouds 58 and 158 are shown including three and four tabs, respectively, the shrouds can include any number of tabs suitable for coupling to the adaptors 68 and 168.

In some instances, the nozzle tip assembly 40 may be damaged during OEM assembly, for example, the thermal barrier coating of the shroud 58 may be chipped during handling or the nozzle tip assembly may need to be overhauled due to damage to the assembly while in use. With conventional fuel injectors, the previously used permanent connections render the nozzle tip assembly unserviceable, leading to total replacement of the assembly instead of allowing for repair of or replacement of a sub-assembly. Using the exemplary nozzle tip assembly 40, the assembly 40 can be overhauled by separating the shroud 58 from housing 42 at weld 82. In some instances, if the weld at 82 has failed, the nozzle tip assembly 40 will only be secured by the secondary retention device and therefore there will not be a weld that needs to be removed. The at least one tab 64 can then be flexed or deformed inwardly to release the shroud 58 from the housing 42 for removal. The axial elongation of the tabs facilitates flexing thereof.

Once the shroud 58 has been removed, the nozzle tip assembly 40 can be overhauled, for example by servicing a shroud 58 with a chipped thermal barrier coating, servicing the fluid injection device 72, etc. Alternatively, if the shroud 58 were damaged beyond repair or one of either the inner shell or the outer shell were damaged beyond repair, a new shroud or some combination of old and new parts can be assembled to form a shroud. The shroud 58 or new shroud can then be inserted into the fuel injector 30 via the downstream end of the housing 42. Once inserted into the fuel injector 30, the shroud 58 or new shroud can be secured to the adaptor 68 via the at least one tab 64. Then, the shroud 58 or new shroud can be welded at 82 to the housing 42 and the fuel injector 30 put back in service.

Figure 9:
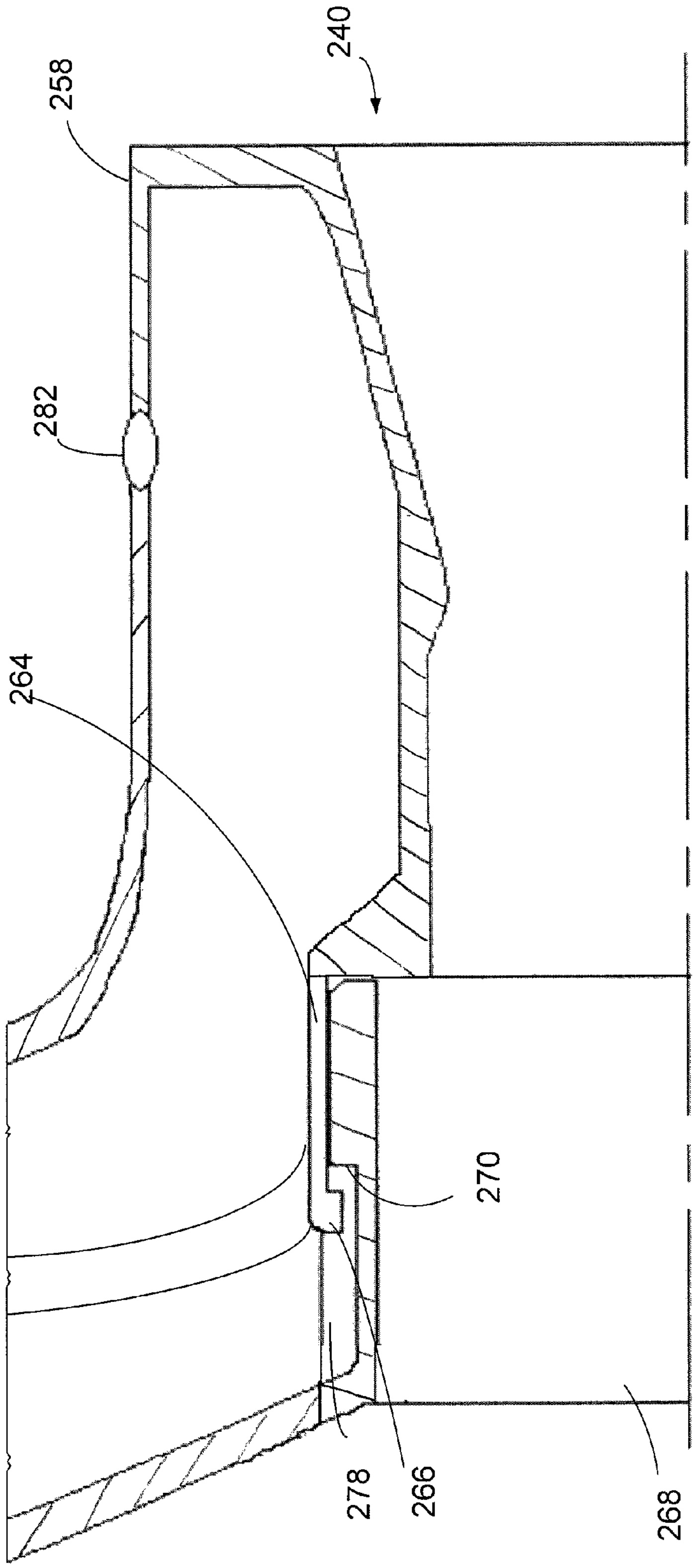
FIG. 9 is a fragmentary cross-sectional view of another fuel injector showing details of an exemplary nozzle tip assembly in accordance with the invention.

Turning now to FIG. 9, another exemplary embodiment of the nozzle tip assembly is indicated generally by reference numeral 240. The nozzle tip assembly 240 may be substantially the same as the above referenced nozzle tip assembly 40, although some details have been omitted. The same reference numerals indexed by 200 are used to denote the structures corresponding to similar structures in the nozzle tip assembly 40.

Figure 10:
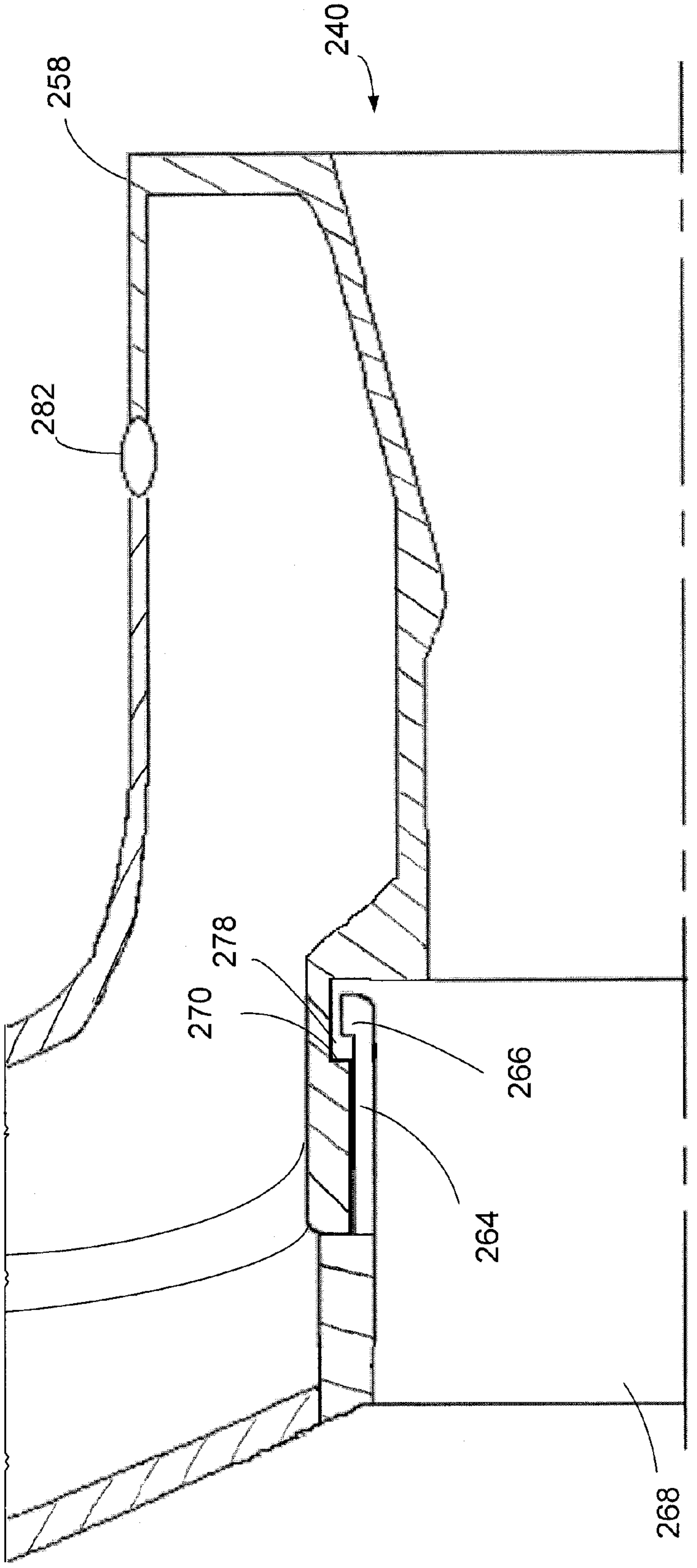
FIG. 10 is a fragmentary cross-sectional view of still another fuel injector showing details of an exemplary nozzle tip assembly in accordance with the invention.

In the nozzle tip assembly 240, the tabs/fingers are disposed radially outwardly of the adaptor whereas in the nozzle tip assembly 40 the tab/fingers are disposed radially inwardly of the adaptor. More particularly, the shroud 258 includes at least one tab that cooperates with a ledge on the adaptor for coupling the shroud to the adaptor, although it will be appreciated that the at least one tab may be included on either the shroud or adaptor and the cooperating ledge on the other. As illustrated in FIG. 10, the at least one tab 264 is on the adaptor 268 and the ledge 270 is on the shroud 258.

Although the tab may be annularly continuous in some embodiments, more preferably the tab 264 is in the form of one or more fingers that are circumferentially spaced apart and extend axially rearwardly from a body portion of the shroud 258. At their rearward ends, each finger is provided with a radially inwardly projecting catch 266 for engaging the ledge (or ledges) on the adaptor.

The ledge or ledges may be formed in any suitable manner on the adaptor 268. The ledge, for example, may be formed by an axial end face of the adaptor, although in the illustrated embodiment the ledge is in the form of plural ledges 270 for respective fingers 264. The ledges are formed by the axially rearwardly facing end face of respective axial recesses 278 formed in the outer diameter surface of the adaptor 268, which recesses preferably are in the form of grooves. The recesses/grooves are circumferentially spaced apart in correspondence to the circumferential spacing of the tabs/fingers 264. If the primary retention device, e.g. weld 282, holding the shroud to the housing were to fail, any axial separation movement of the shroud relative to the adaptor would cause the catches to engage the ledges and create an axial interference to prevent separation of the shroud from the adaptor and thereby prevent damage to the gas turbine engine. Although when assembled the catches can be butted against the ledges, in the illustrated embodiment a space is provided to accommodate differential expansion of the adaptor and shroud while still providing a secondary retention feature.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A nozzle tip assembly for an injector including an adaptor having at least one axially rearwardly facing ledge, a shroud configured to support an injection device interiorly of the shroud, and a plurality of circumferentially spaced fingers projecting rearwardly from a body of the shroud, each of the plurality of the circumferentially spaced fingers having rearward ends and radially outwardly or inwardly projecting catches at the rearward ends that engage the at least one axially rearwardly facing ledge of the adaptor for attaching the shroud to the adaptor.

2. The nozzle tip assembly according to claim 1, wherein the each of the plurality of the circumferentially spaced fingers is resiliently flexible for insertion or removal of the shroud with respect to the adaptor.

3. The nozzle tip assembly according to claim 1, wherein the plurality of the circumferentially spaced fingers allows air flow to pass through the injector without being interrupted by the plurality of the circumferentially spaced fingers.

4. The nozzle tip assembly according to claim 1, wherein the each of the plurality of the circumferentially spaced fingers is deformed radially outwardly or inwardly to form a respective catch after the shroud has been assembled into the adaptor.

5. The nozzle tip assembly according to claim 1, wherein the at least one axially rearwardly facing ledge includes a plurality of ledges for cooperating with respective catches of the plurality of the circumferentially spaced fingers.

6. The nozzle tip assembly according to claim 5, wherein the ledges are formed at an axially forward end of an axially extending groove or grooves.

7. The nozzle tip assembly according to claim 1, further including the injection device supported internally of the shroud.

8. An injector including a housing and the nozzle tip assembly according to claim 1, wherein the nozzle tip assembly is assembled in the housing.

9. The nozzle tip assembly according to claim 1, wherein the each of the plurality of the circumferentially spaced fingers has radially outwardly projecting catches.

10. The nozzle tip assembly according to claim 1, wherein the each of the plurality of the circumferentially spaced fingers has radially inwardly projecting catches.

11. A nozzle tip assembly for an injector including:

an adaptor having a plurality of axially rearwardly facing ledges;

an injection device; and a shroud configured to support the injection device interiorly of the shroud, the shroud including a plurality of circumferentially spaced fingers projecting rearwardly from a body of the shroud, each of the plurality of the circumferentially spaced fingers having a rearward end and a radially outwardly projecting or inwardly projecting catch at the rearward end for engaging a respective one of the plurality of the axially rearwardly facing ledges to prevent axial separation of the shroud from the adaptor.

12. The nozzle tip assembly according to claim 11, wherein the each of the plurality of the circumferentially spaced fingers has radially outwardly projecting catches.

13. The nozzle tip assembly according to claim 11, wherein the each of the plurality of the circumferentially spaced fingers has radially inwardly projecting catches.

14. A fuel injector for a gas turbine engine, the fuel injector including:

a housing having a first end provided with a mount for attachment of the housing to an outer casing of the gas turbine engine and a second end; and a nozzle tip assembly at the second end of the housing, the nozzle tip assembly including:

an adaptor disposed in and coupled to the second end of the housing, the adaptor including a plurality of axially rearwardly facing ledges;

a shroud coupled to the housing and at least partially surrounded by the adaptor, the shroud including a plurality of circumferentially spaced fingers projecting rearwardly from a body of the shroud, each of the plurality of the circumferentially spaced fingers having a rearward end and a radially outwardly projecting or inwardly projecting catch at the rearward end that engages a respective one of the axially rearwardly facing ledges for attaching the shroud to the adaptor; and a fluid injection device supported interiorly of the shroud.

15. The fuel injector according to claim 14, where the adaptor is coupled to an upstream end of the housing.

16. The fuel injector according to claim 14, wherein the shroud is coupled to a downstream end of the housing.

17. The fuel injector according to claim 14 further including an air swirler, wherein the fluid injection device is configured to disperse the fluid to the air swirler to be mixed with air flowing through the injector.

18. The fuel injector according to claim 14, wherein the adaptor includes an aperture through a wall of the adaptor for allowing fuel to pass from outside the adaptor to the fluid injection device.

19. A gas turbine engine including an outer casing, a combustor within the interior of the outer casing, and the fuel injector according to claim 14, with the mount of the housing attached to the outer casing with the nozzle tip assembly disposed interiorly of the combustor and supported by the housing separate from the combustor.

* * * * *